United States Patent [19]

Grabher et al.

[11] Patent Number: 4,550,955
[45] Date of Patent: Nov. 5, 1985

[54] PRETENSIONING ELEMENT FOR CIRCULATION TRACK BEARING MEMBER FOR LINEAR BEARINGS

[75] Inventors: Erich Grabher, Dietlikon; Max Müller, Zürich; Horst Wetzel, Wettingen; Robert Schultschik, Uster, all of Switzerland

[73] Assignee: Werkzeugmaschinenfabrik Oerlikon-Bührle AG, Zürich, Switzerland

[21] Appl. No.: 665,294

[22] Filed: Oct. 26, 1984

[30] Foreign Application Priority Data

Nov. 4, 1983 [CH] Switzerland ............ 5954/83

[51] Int. Cl.[4] .............. F16C 29/06; F16C 23/06
[52] U.S. Cl. ................... 308/6 C; 384/267
[58] Field of Search ............ 308/6 C, 6 R, 3 R; 384/247, 267–269, 519, 538, 583, 616

[56] References Cited

U.S. PATENT DOCUMENTS

| | | | |
|---|---|---|---|
| 307,394 | 10/1884 | Jackson | 384/267 |
| 1,490,173 | 4/1924 | Kando | 384/267 |
| 2,270,500 | 1/1942 | Brill | 384/267 |
| 2,440,919 | 5/1948 | Shaw | 308/3 R |
| 3,020,097 | 2/1962 | Bullard et al. | 308/3 R |
| 3,272,569 | 9/1966 | Mergen | 308/6 C |
| 3,389,625 | 6/1968 | Wagner | 308/6 C |
| 3,455,610 | 7/1969 | Meinke | 308/6 R |
| 4,278,306 | 7/1981 | Douglas | 308/6 C |
| 4,376,556 | 3/1983 | Bergman et al. | 308/6 C |

FOREIGN PATENT DOCUMENTS

| | | |
|---|---|---|
| 1022851 | 1/1958 | Fed. Rep. of Germany . |
| 2449977 | 1/1976 | Fed. Rep. of Germany . |
| 2718362 | 2/1978 | Fed. Rep. of Germany . |
| 1342910 | 10/1963 | France . |
| 82950 | 3/1964 | France . |
| 2049220 | 3/1971 | France . |
| 2109281 | 5/1972 | France . |
| 2424095 | 11/1979 | France . |
| 200998 | 6/1983 | German Democratic Rep. .... 308/6 C |

Primary Examiner—Donald Watkins
Assistant Examiner—Thomas R. Hannon
Attorney, Agent, or Firm—Werner W. Kleeman

[57] ABSTRACT

The pretensioning element serves to elevationally position or pretension or bias a circulation track bearing member. In order to reduce the requirements imposed upon the support and mounting surfaces during manufacture, with regard to alterations in parallelism during pretension adjustment and during load changes, that is in the range of elastic deformation, there is provided a housing which comprises at least one guide track. Two wedge members are displaceably guided in the guide track by means of tightening screws or bolts. The wedge members contain first wedge surfaces. A support plate is provided and comprises two second wedge surfaces which cooperate with the first wedge surfaces of the wedge members.

5 Claims, 6 Drawing Figures

4,550,955

PRETENSIONING ELEMENT FOR CIRCULATION TRACK BEARING MEMBER FOR LINEAR BEARINGS

BACKGROUND OF THE INVENTION

The present invention relates to a new and improved construction of a pretensioning element or arrangement for circulation track bearing members for linear bearings for lengthwise guide means or guides of machines and other apparatus and provided with an elevationally or positionally adjustable device.

The pretensioning or biasing elements serve to elevationally or positionally adjust or to pretension or bias the circulation track bearing members or shoes which, for example, constitute part of roller bearings or linear bearings working with continuous circulation of roller bodies, in order to enable precise positioning of, for instance, slide or carriage guides in machine tools or the like.

There is known in practice a pretensioning or biasing element or arrangement comprising two ground wedge-shaped or spline ledges which are mutually guided by means of a central adjusting or fitting ledge. The known pretensioning or biasing element or arrangement further comprises an adjusting plate which is mounted with its end face at one of the wedge-shaped ledges by means of adjusting screws or bolts and counter bolts. It is absolutely required for utilizing the maximum bearing or load-carrying capacity, the rigidity or stiffness and the quiet running of the known circulation track bearing members that the guide track, the support surface and the mounting surfaces at the pretensioning or biasing element or arrangement as well as the parallelism of such surfaces have the best possible quality.

SUMMARY OF THE INVENTION

Therefore, with the foregoing in mind it is a primary object of the present invention to provide a new and improved construction of a pretensioning element or arrangement for a circulation track bearing member or shoe for a linear bearing for lengthwise guide means or guides of machines and other apparatus, which pretensioning or biasing element enables a reduction in the requirements with respect to the machining quality and the parallelism of the supporting surface and the mounting surfaces thereof without impairing the qualities of the circulation track bearing members, such as their bearing or load-carrying capacity, their ridigity or stiffness and their quiet running.

Now in order to implement this and still further objects of the invention, which will become more readily apparent as the description proceeds, the pretensioning or biasing element or arrangement of the present development is manifested by the features that such comprises a housing containing at least one guide track, two wedge members each have a first wedge-shaped surface and arranged in the at least one guide track and guided therein for displacement in lengthwise direction, a tightening device, such as a tightening bolt or screw for the two wedge members in order to displace the latter relative to each other, and a support plate containing two second wedge-shaped surfaces which bear upon the first wedge-shaped surfaces of of the two wedge members.

The advantages achieved by the invention are essentially that imprecisions in the alignment surfaces can be three-dimensionally compensated during the adjustment of the pretension or bias. In this manner the alignment surfaces can be matched or fitted to the guiding surface in an optimum manner.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
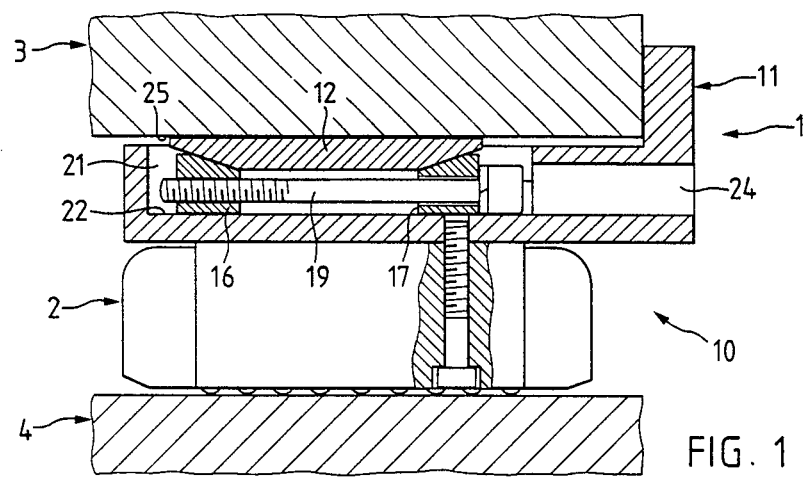
FIG. 1 is a partially sectional view along the line A—A in FIG. 2 of a first exemplary embodiment of the inventive pretensioning or biasing element or arrangement in the installed state thereof.

Describing now the drawings, it is to be understood that only enough of the construction of the pretensioning or biasing element or arrangement for a circulation track bearing member of a linear bearing has been shown as needed for those skilled in the art to readily understand the underlying principles and concepts of the present development, while simplifying the showing of the drawings. Turning attention now specifically to FIG. 1, there has been partially illustrated partially in section a travelling or circulating unit 10, here shown comprising a pretensioning or biasing element or arrangement 1 and a circulation track bearing member or shoe 2 which is secured to the pretensioning or biasing element 1. The circulation track bearing member or shoe 2 is installed or arranged between a slide or carriage 3 and a lengthwise guide or lengthwise guide means 4. The pretensioning or biasing element 1 can be mounted in conventional and therefore not particularly illustrated manner at the slide or carriage 3.

Figure 3:
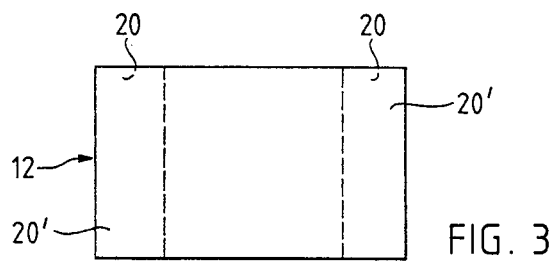
FIG. 3 shows a top plan view of the support plate of the pretensioning or biasing element or arrangement shown in FIG. 2.
Figure 2:
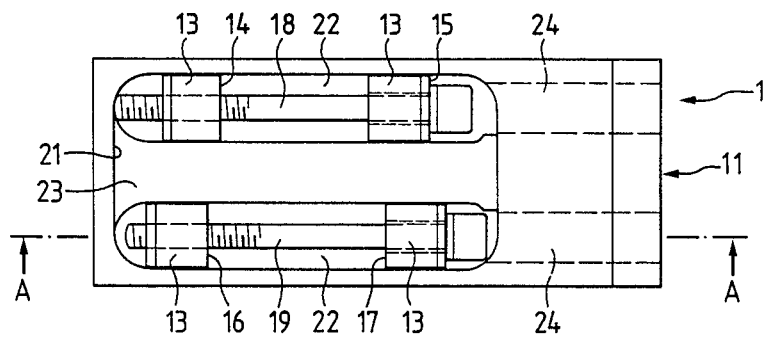
FIG. 2 is a top plan view of a part of the pretensioning or biasing element shown in FIG. 1.

As also illustrated in FIGS. 2 and 3, the pretensioning or biasing element 1 comprises a housing 11 and a predetermined number of wedge members which, in the illustrated exemplary embodiment, constitute four wedge members 14, 15, 16 and 17. There are further provided in the pretensioning or biasing element 1 two tightening screws or bolts 18 and 19 or equivalent tightening means, each of which interconnects two related wedge members 14, 15 and 16, 17 of the four wedge members 14 to 17. The pretensioning or biasing element 1 also comprises a support plate 12. For better clarity of the drawings the support plate 12, which is shown in a top plan view in FIG. 3, is not depicted in FIG. 2 of the drawings. However, the corresponding position of such support plate 12 is evident from FIG. 1 which shows the pretensioning or biasing element 1 according to a section taken along the line A—A in FIG. 2.

The housing 11 of the pretensioning or biasing element 1 comprises a substantially rectangularly shaped recess or cut-out section 21 with rounded edges and at least two guide tracks 22. In the illustrated exemplary embodiment there are shown only two such guide tracks 22 for the housing 11. Such guide tracks 22 are sunk into the recess or cut-out section 21; they are separated by a web member 23 and extend parallel to each other as shown in FIG. 2. Related bores or through-bores 24 are placed or provided in axial continuations of the two guide tracks 22.

In each one of these two guide tracks 22 there are displaceably guided in the lengthwise direction of each such guide track 22 the two associated wedge members 14, 15 and 16, 17. Each such two associated wedge members 14, 15 and 16, 17 are interconnected by the related tightening screws or bolts 18 and 19 and are thus displaceably arranged relative to each other. The displacement can be accomplished from the outside through the bore or through-bore 24 by using an appropriate tool, such as a wrench, for example, a wrench for socket head cap screws, since the wedge members 14 and 16 are threadably connected to the related tightening screws or bolts 18 and 19. The other wedge members, namely the wedge members 15 and 17, contain a related through-bore or passage for the stems of the related tightening screws or bolts 18, 19.

At each one of the four wedge members 14 to 17 there is arranged and formed a related first wedge-shaped surface 13. At the support plate 12 there are arranged and formed at least two second wedge-shaped surfaces 20 which, in the illustrated exemplary embodiment, constitute two such second wedge-shaped surfaces 20. The first wedge-shaped surfaces 13 at the four wedge members 14 to 17 and the two second wedge-shaped surfaces 20 at the support plate 12 are arranged and formed such that the support plate 12 bears upon the four wedge members 14 to 17 by means of the second wedge-shaped surfaces 20 and the first wedge-shaped surfaces 13.

Precise and rigid guide systems require absence of play from and high rigidity or stiffness of the bearing structure. This is accomplished by, for example, pairwise or triply installing circulation track bearing members or shoes at each bearing location and mutually pretensioning or biasing such circulation track bearing members. When using the inventive pretensioning or biasing element 1 the pretension or bias is obtained by pressing the support plate 12 against a support surface 25 of the slide or carriage 3. For elevational or positional adjustment, the related wedge members 14, 15 and 16, 17 are uniformly or equally displaced relative to each other by using the tightening screws or bolts 18 and 19. A transverse inclination or a transverse pivot is balanced or compensated for by different elevational adjustments using the tightening screws 18 and 19 and the related pairs of wedge members 14, 15 and 16, 17 connected therewith in the manner as shown in exaggeration in FIG. 2.

An error in lengthwise inclination is corrected for by the automatic pivoting in lengthwise direction of the support plate 12 due to the contact pressure resulting from the pretensioning or biasing force.

The two second wedge-shaped surfaces 20 at the support plate 12 define related bearing regions 20' and preferably these two second wedge-shaped surfaces 20 are partially formed to have at least an approximately spherical shape, i.e. are substantially shaped in the manner of a spherical surface or segment of a sphere in such bearing regions 20', that is in the region of the contemplated contact surfaces with the related four first wedge-shaped surfaces 13 at the corresponding wedge members 14, 15 and 16, 17. Additionally, the first wedge-shaped surfaces 13 at the wedge members 14 to 17 can be provided with a transverse inclination which is directed towards the center of the pretensioning or biasing element 1. The support plate 12 is then approximately spherically mounted or supported and is thus enabled to balance or compensate for relatively small errors in parallelism by its two-dimensional freedom of movement. Tilting or canting can thus be prevented at the first wedge-shaped surfaces 13 and at the second wedge-shaped surfaces 20.

Figure 4:
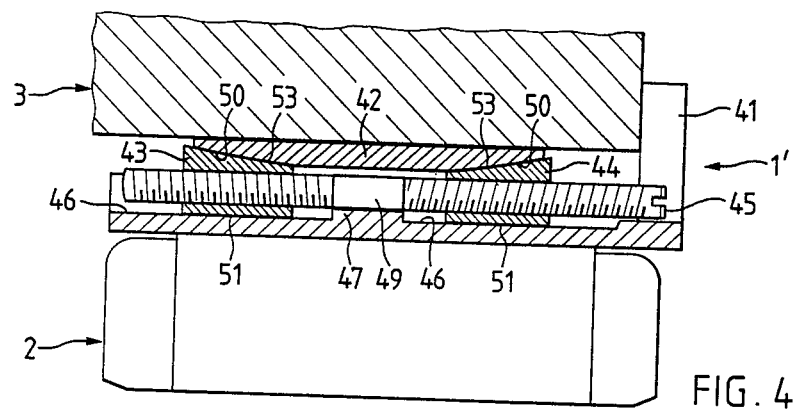
FIG. 4 is a partially sectional view along the line B—B in FIG. 5 of a second exemplary embodiment of the inventive pretensioning or biasing element or arrangement.
Figure 5:
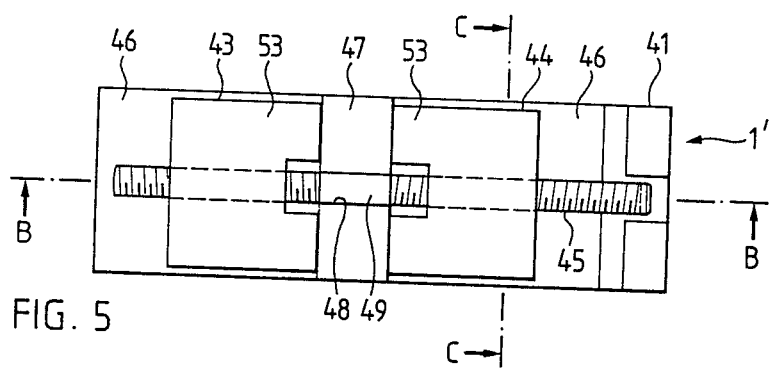
FIG. 5 is a top plan view of a part of the pretensioning element or arrangement shown in FIG. 4.
Figure 6:
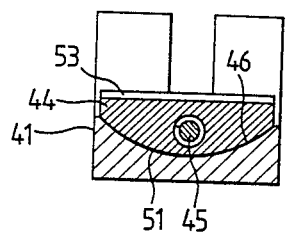
FIG. 6 is a section along the line C—C in FIG. 5.

In FIG. 4 a second exemplary embodiment of the inventive pretensioning or biasing element or arrangement 1' is shown and such pretensioning or biasing element 1' is arranged analogous to FIG. 1 between the slide or carriage 3 and the circulation track bearing member or shoe 2. The pretensioning or biasing element 1' comprises a housing 41, a support plate 42, two wedge members 43 and 44 and one tightening screw or bolt 45. FIGS. 5 and 6 also show the pretensioning or biasing element 1', however, again without the support plate 42. A guide track 46 is arranged in the housing 41 in a lengthwise direction thereof. The housing 41 is subdivided by a guiding rib or web member 47 containing a guiding groove 48 for a stem member 49 of the tightening screw or bolt 45. The guide track 46 is formed with a circular arc-shape in cross-section. In this manner two guide track portions are formed and in each one of these two guide track portions a related one of the two wedge members 43 and 44 is arranged. The wedge members 43, 44 are structured such as to substantially form the shape of a cylinder section and they are provided with a left-hand thread and a right-hand thread, respectively. These two wedge members 43, 44 are guided for linear displacement in lengthwise direction and are displaceable relative to each other by means of the tightening screw or bolt 45 which contains a left-hand thread and a right-hand thread. The support plate 42 again contains two second wedge-shaped surfaces 50 which cooperate with related first wedge-shaped surfaces 53 at the two wedge members 43, 44. Guide surfaces 51 at the two wedge members 43, 44 are structured so as to substantially form a circular arc in cross-section and such two guide surfaces 51 enable transverse pivoting in the guide track 46 which has a corresponding complementary shape. In order to precisely correct for greater errors in lengthwise inclination, the support plate 42 is preferably structured so as to substantially form the section of a cylinder.

While there are shown and described present preferred embodiments of the invention, it is to be distinctly understood that the invention is not limited thereto, but may be otherwise variously embodied and practiced within the scope of the following claims.

Accordingly, what we claim is:

1. A pretensioning arrangement for a circulation track bearing member of a linear bearing translatably guiding a movable member of a machine in relation to lengthwise guide means of the machine, comprising:
   a housing having means for securing the circulating track bearing member to said housing and means for mounting said housing to the movable member of the machine between the movable member and the lengthwise guide means of the machine for forming a circulating unit of the linear bearing;

said housing containing:

at least two guide tracks each extending in a lengthwise direction substantially parallel to the lengthwise guide means;

a first wedge member and a related second wedge member guided in each guide track of said at least two guide tracks for mutual displacement in said lengthwise direction;

each wedge member of said first and said second wedge members defining a respective therewith associated first wedge surface;

a tightening device arranged in each said guide track;

each said tightening device operatively engaging said first wedge member and said second wedge member for effecting a relative displacement therebetween;

at least one support plate for supporting said circulating unit on the movable machine member;

said at least one support plate defining two second wedge surfaces arranged to confront said first wedge surfaces of said first and second wedge members; and said first wedge surfaces cooperating with said tightening means and with said second wedge surfaces for positionally adjustably supporting said housing and conjointly therewith the circulating track bearing member in relation to said support plate.

2. The pretensioning arrangement as defined in claim 1, wherein:

each second wedge surface of said two second wedge surfaces defined by said support plate comprises a bearing region; and each said second wedge surface having substantially the configuration of a segment of a sphere at least in said bearing region thereof.

3. The pretensioning arrangement as defined in claim 2, wherein:

each said first wedge surface defined by said first and second wedge members has a first inclination in said lengthwise direction; and each said first wedge surface having a second inclination in a direction extending transverse to said lengthwise direction for cooperating with said bearing region having substantially the configuration of a segment of a sphere.

4. A pretensioning arrangement for a circulation tract bearing member of a linear bearing translatably guiding a movable member of a machine in relation to lengthwise guide means of the machine, comprising:

a housing having means for securing the circulating track bearing member to said housing and means for mounting said housing to the movable member of the machine between the movable member and the lengthwise guide means of the machine for forming a circulating unit of the linear bearing;

said housing containing:

a guide track extending in a lengthwise direction substantially parallel to the lengthwise guide means;

said guide track having a guide surface with a substantially circular arc-shape in cross-section;

a first wedge member and a second wedge member guided in said guide track for displacement in said lengthwise direction;

each wedge member of said first and second wedge members having a guide surface for cooperating with said guide surface of said guide track and defining a respective therewith associated first wedge surface;

a tightening device arranged in said guide track;

said tightening device operatively engaging said first wedge member and said second wedge member for effecting a relative displacement therebetween;

at least one support plate for supporting said circulating unit on the movable machine member;

said at least one support plate defining two second wedge surfaces arranged to confront said first wedge surfaces of said first and second wedge members;

said first wedge surfaces cooperating with said tightening means and with said second wedge surfaces for positionally adjustably supporting said housing and conjointly therewith the circulating track bearing member in relation to said support plate.

5. The pretensioning arrangement as defined in claim 4, wherein:

said support plate has substantially the configuration of a segment of a cylinder.

* * * * *